March 8, 1966 J. J. GODBEY 3,239,803
VARIABLE CAPACITANCE GEOPHONE ASSEMBLY FOR SEISMIC PROSPECTING
Original Filed June 10, 1957 3 Sheets-Sheet 1

INVENTOR.
Josiah J. Godbey
BY
ATTORNEY

ATTEST
Charles F. Steininger

March 8, 1966   J. J. GODBEY   3,239,803
VARIABLE CAPACITANCE GEOPHONE ASSEMBLY FOR SEISMIC PROSPECTING
Original Filed June 10, 1957   3 Sheets-Sheet 2

ATTEST
Charles F. Steininger

INVENTOR.
Josiah J. Godbey
BY Robert E. Bird
ATTORNEY

March 8, 1966 J. J. GODBEY 3,239,803
VARIABLE CAPACITANCE GEOPHONE ASSEMBLY FOR SEISMIC PROSPECTING
Original Filed June 10, 1957 3 Sheets-Sheet 3

ATTEST
Charles F. Steininger

INVENTOR.
Josiah J. Godbey,
BY
ATTORNEY

United States Patent Office 3,239,803
Patented Mar. 8, 1966

3,239,803
VARIABLE CAPACITANCE GEOPHONE ASSEMBLY FOR SEISMIC PROSPECTING
Josiah J. Godbey, Richardson, Tex., assignor to The Atlantic Refining Company, Philadelphia, Pa., a corporation of Pennsylvania
Original application June 10, 1957, Ser. No. 664,597, now Patent No. 3,153,221, dated Oct. 13, 1964. Divided and this application June 13, 1960, Ser. No. 35,568
2 Claims. (Cl. 340—17)

This application is a division of application Serial No. 664,597, filed June 10, 1957 and now Patent No. 3,153,221.

This invention relates to seismic prospecting apparatus. In a still more specific aspect, it relates to a novel geophone which converts seismic waves into a frequency modulated electric signal.

Heretofore, in the art of geophysical prospecting, subterranean geological formations have been mapped by firing an explosive charge at a shot point near the surface of the earth and determining, at one or more points remote from the shot point, the time required for explosion waves to be elastically propagated through the earth from the shot point to the points at which the waves are measured. The travel time between the shot point and the point of reception will give an indication of the depth and nature of the subterranean formations through which such waves have passed. Ordinarily, the earth waves are picked up by geophones and, in previous systems, the geophone stations and the recording vehicle were customarily connected by a large multiconductor cable. It is well known that the multiconductor geophone cables which have heretofore been employed in seismic work are expensive, difficult to use, and are a constant source of trouble. It would, therefore, be desirable to provide a means for replacing multiconductor cables with inexpensive two-conductor geophone cables.

Many areas which are covered by large bodies of relatively shallow water, for example, certain areas overlain by the Gulf of Mexico, seem to offer sufficient promise of petroleum deposits to warrant careful exploration. From the very nature of underwater exploration, however, as opposed to comparable seismic methods used on land, problems concerning the use of a cumbersome multiconductor geophone cable have become even more aggravated and have not, hitherto, been successfully solved.

In addition to the great initial expense of a conventional marine geophone cable, the expense caused by failure of the cable can be enormous. For example, it may take many days to find and repair a fault in a conventional marine geophone cable. During this time, the rental on boats and equipment and the man-hours lost can, and often does, amount to tens of thousands of dollars. The time necessary to test individual wires for faults is, of course, factorially related to the number of conductors in the cable. Moreover, it is generally not feasible to isolate segments of a marine cable containing a large number of conductors, either for testing or replacement purposes, since suitable waterproof multicontact connectors, which will allow the geophones to be connected together by segments of cable, have not been designed; and, hence, the geophones of a conventional geophone cable are generally either integral parts of the cable or attached to the main cable by branch cables. Thus it becomes apparent that a large portion of the cost of marine seismic prospecting would be eliminated by the use of a geophone cable with only two conductors which could be rapidly tested and easily connected to or disconnected from geophones or other segments of cable.

Accordingly, one object of this invention is to provide apparatus for seismic prospecting wherein the need for multiconductor geophone cables is eliminated.

Still another object of this invention is to provide a novel geophone which converts seismic waves into a corresponding frequency modulated electrical signal.

A further object of this invention is to provide a novel geophone which converts seismic waves into a corresponding frequency modulated electrical signal whereby output signals from a plurality of geophones may be simultaneously impressed on a single two-conductor cable.

Other objects and advantages of this invention will become apparent from the following description taken in connection with the accompanying drawings.

The preferred form of the instant invention is illustrated in the drawings wherein.

Briefly, the seismic prospecting apparatus shown comprises one or more novel geophones including an oscillator and means responsive to seismic waves for varying the frequency of the oscillator, a single two-conductor cable which simultaneously conveys the signals from a plurality of geophones, a novel crystal controlled discriminator for detecting each of the geophone signals and converting them to electrical signals corresponding to the received seismic waves, an amplifier and recorder.

Figure 1:
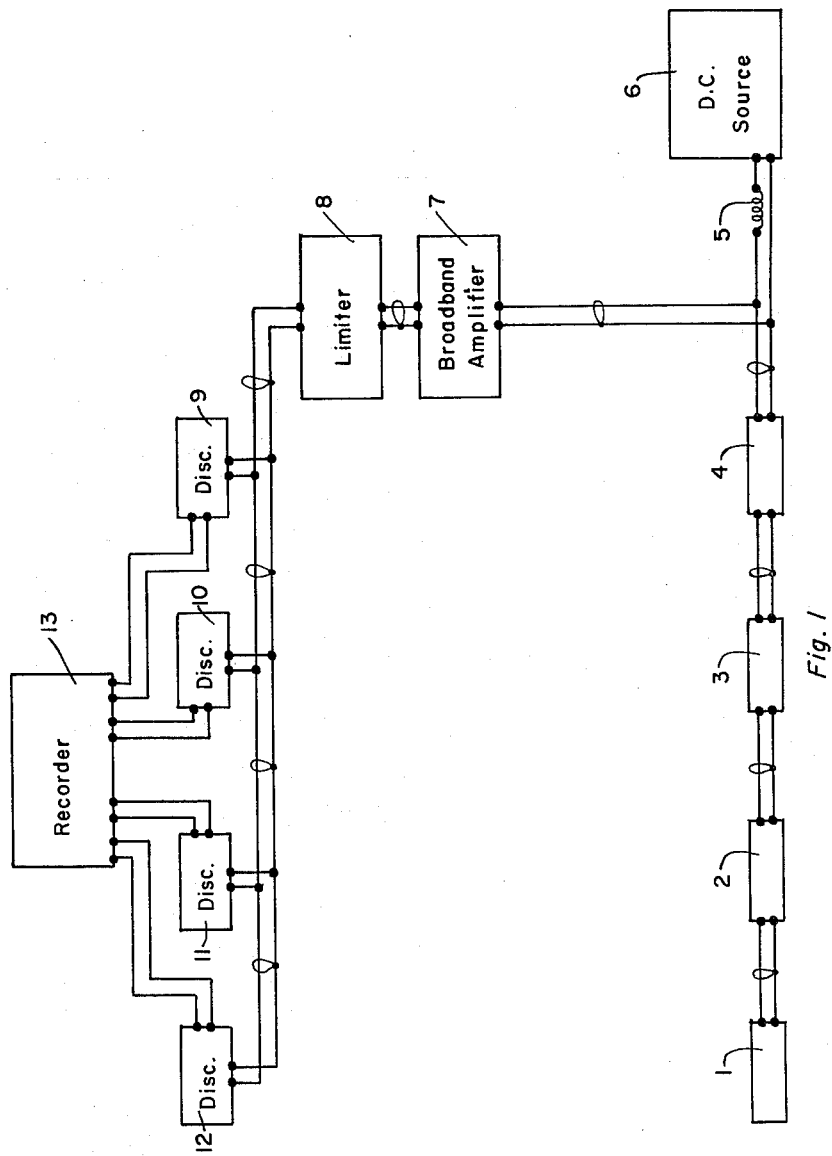
FIGURE 1 is a block diagram illustrating the complete seismic prospecting system.

Referring now to the drawings in detail, a block diagram illustrating the complete system for receiving seismic waves in accordance with this invention is shown in FIGURE 1. Geophones 1, 2, 3, and 4 are connected together by segments of coaxial cable. These geophones are constructed in such a manner as will be hereinafter more fully explained, that each geophone modulates a different carrier frequency in response to receive seismic waves. Carrier frequencies for each of the geophones should be spaced apart in the spectrum, as is well known by those skilled in the art, so that interference between the signals produced by the geophones will be eliminated. For example, geophone 1 may have a carrier, or center, frequency of 500 kilocycles, geophone 2 may have a carrier frequency of 510 kilocycles, and so on, with each successive geophone having a carrier frequency 10 kilocycles higher than the precedeing carrier frequency. It is obvious that a great many geophones may be connected together in this manner by a single two-conductor cable and that all, or any combination, of their signals may be simultaneously impressed upon the cable and yet remain distinct insofar as frequency is concerned provided a substantial majority of the sideband energy of the frequency modulated wave is contained within a bandwidth of ten kilocycles.

Direct current may be supplied to the filament and plate circuits of the geophones by the same two-conductor cable on which the frequency modulated signals from the geophones are impressed. This is accomplished by placing inductor 5 in series with the center or "hot" conductor of the coaxial cable and direct current source 6. Inductor 5 is chosen to have an inductive reactance of such a value that the impedance between the conductors of the cable is maintained at a relatively high value regardless of the internal resistance of direct current source 6. Of course, separate conductors could be used for conveying direct current to the geophones; and, if this is the case, coaxial cable need not be used for conducting the composite signals from the geophones, since these conductors can now be balanced with respect to ground.

Broadband amplifier 7 is connected in parallel with the geophone cable as shown by FIGURE 1. Broadband amplifier 7 may be conventional amplifier with a frequency response which is essentially flat throughout the frequency range in which signals from the geophones are located. After passing through broadband amplifier 7, the signal is preferably passed through limiter 8, and then to discriminators 9, 10, 11, and 12. Limiter 8 performs the conventional function of eradicating amplitude modulation from the signal so that the signal presented to the discriminator will be wholly frequency modulated. This is desirable because most conventional frequency modulation discriminators, as well as the preferred discriminator, which will be hereinafter discussed, are sensitive to amplitude variations in a frequency modulated signal. If a discriminator, such as a ratio detector, is employed which is insensitive to variations in amplitude, then limiter 8 is unnecessary.

The output of limiter 8 is connected in parallel to the inputs of all the discriminators. Each discriminator, however, is designed to be responsive only to frequency modulated signals which are generated by a corresponding geophone. In the exemplified case where geophones 1, 2, 3, and 4 have carrier frequencies of 500, 510, 520, and 530 kilocycles, respectively, discriminators 9, 10, 11, and 12 would be responsive only to frequencies in the immediate vicinity of 500, 510, 520, and 530 kilocycles, respectively. Thus, each discriminator converts the frequency modulated signal of a corresponding geophone into an electrical wave representative of the seismic wave which acted upon the geophone. The output of each discriminator may be recorded in the conventional manner by recorder 13; and it is preferred that recorder 13 include amplifying, filtering, and gain control circuits as desired.

It will be recognized by those skilled in the art that many modifications and variations of this system are within the scope of this invention. One variation might be eliminating limiter 8 and using a discriminator, such as a ratio detector, which is not sensitive to variations in amplitude of the frequency modulated signal. Another variation might consist of connecting the input of limiter 8 directly to the geophone cable, and then amplifying the output signal of each discriminator with individual conventional seismic amplifiers before it is recorded. It will also be understood that as many geophones as desired may be connected to the same two-conductor cable so long as each geophone operates in a different frequency range from any other geophone and each geophone is accompanied by a corresponding discriminator.

Figure 2:
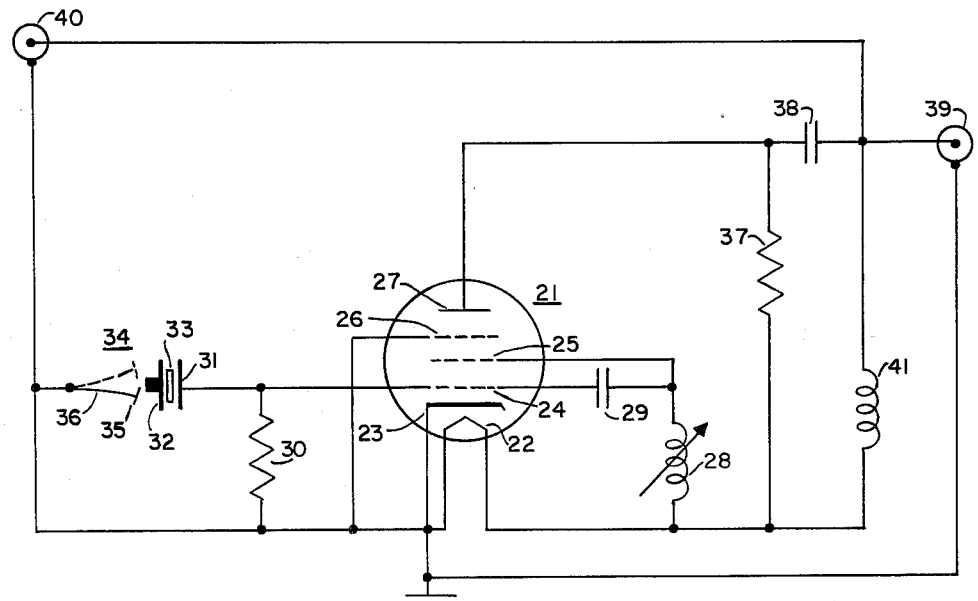
FIGURE 2 is a schematic circuit diagram of the preferred form of the novel geophone disclosed in this invention.

FIGURE 2 of the drawings is a schematic circuit diagram illustrating the preferred form of the novel geophone disclosed in this invention. This geophone includes vacuum tube 21, containing filament 22, indirectly heated cathode 23, control grid 24, screen grid 25, suppressor grid 26, and plate 27. Suppressor grid 26 may be connected to cathode 23 either internally or externally of vacuum tube 21. Both suppressor grid 26 and cathode 23 are connected to ground. Screen grid 25 is connected to positive voltage by means of tuned inductor 28 and to control grid 24 by means of feedback capacitor 29.

Control grid 24 is also connected to grid bias resistor 30 and crystal holder electrode 31. The crystal holder comprises electrodes 31 and 32 with piezoelectric crystal 33 disposed therebetween in the conventional manner. Crystal holder electrode 32 is additionally constructed in such a manner as to form one plate of a capacitor 34. The other plate of capacitor 34 is formed by plate member 35, which is in turn suspended by vibrating wire 36 and connected to ground.

It will become apparent to those skilled in the art that the above-described circuitry is essentially a crystal controlled oscillator. Screen grid 25 is the anode of the oscillator. The anode circuit of the oscillator is tuned to be self-resonate at the crystal frequency by means of inductor 28. Capacitor 29 provides capacitance between screen grid 25 and control grid 24 in excess of the interelectrode capacitance of tube 21 to form a feedback circuit so that the oscillator will be self-excited. Resistor 30 provides a path for electrons collected by control grid 24 to ground, and the voltage drop thereacross supplies a bias voltage for control grid 24. The frequency at which the oscillator operates is controlled by piezoelectric crystal 33. Piezoelectric crystal 33 is in turn controlled, within a limited range, by capacitor 34, which is in series with the crystal to ground. Capacitor 34 is composed of crystal holder electrode 32 and plate member 35, and its value varies according to their relative positions.

The plate 27 of tube 21, together with plate load resistor 37 and coupling capacitor 38, forms an output circuit. Plate 27 is connected to positive voltage by a suitable plate load resistor 37 and to the output plugs 39 and 40 of the geophone by coupling capacitor 38. The purpose of coupling capacitor 38 is to prevent any direct current which is present on the output plugs 39 and 40 of the geophone from appearing as a potential on plate 27. It is to be noted that the output circuit is electron-coupled to the oscillator; that is, many electrons which are attracted by the anode of the oscillator, which in this case is screen grid 25, will pass through the screen grid because of its construction and impinge upon plate 27, thereby providing an output signal. Because of this arrangement, the loading of the output circuit will have practically no effect on the performance of the oscillator.

The filament and plate voltage for the oscillator, as shown in FIG. 2, are the same and are brought into the geophone by the same conductors which are utilized to carry the output signal from the geophone. Inductor 41 is placed in the positive conductor to prevent shunting of the output signals, which are present on this conductor, by the filament circuits of the oscillator, and to maintain a relatively high impedance between the two output conductors of the geophone insofar as the output signal of the oscillator is concerned.

Suitable means are also provided for connecting the geophone into the geophone cable, such as coaxial cable connectors 39 and 40. Two cable connectors are employed on each geophone and are connected in parallel so that cable segments may be attached to each end of the geophone, and other signals, together with direct current, may pass therethrough. It should be kept in mind that these cable connectors must carry the plate and filament current for the geophones, as well as their output signals; and the cable connectors should be designed accordingly.

Figure 3:
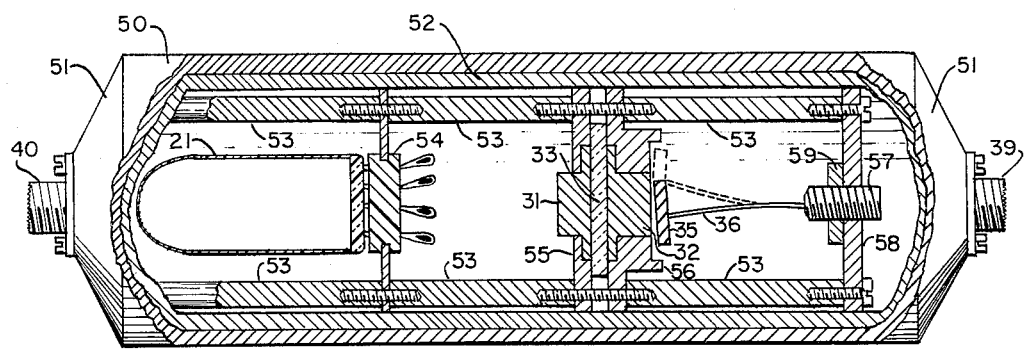
FIGURE 3 is an elevation, partly in section, which shows the major components of the geophone.

The construction of the geophone is illustrated by FIGURE 3. The structure of the geophone comprises a tubular body member 50, which is closed by end members 51. End members 51 may be attached to body member 50 by any expedient means, such as by threads. Coaxial cable connectors 39 and 40 may be mounted on end members 51 as shown. It is preferable that the construction of cable connectors 39 and 40, end members 51 and body member 50 be such that, when properly assembled, the interior of the geophone will be sealed against the entrance of water, or the like, especially if the geophone is to be used underwater.

The interior surfaces of the geophone body are covered by insulating material 52 to prevent the electrical circuits disposed therein from shorting against the body.

The major srtuctural components in the interior of the geophone are rigidly held in the proper spatial relationship within the geophone body by any suitable means, such as spacer members 53, and make up a subassembly, which may be removed from geophone body as a unit. This subassembly includes tube socket 54, a crystal holder assembly, and a variable capacitor assembly which varies in response to seismic waves. Crystal assembly supports 55 and 56 are fabricated from any inflexible electrical insulating material, for instance, Bakelite, and are adapted to support crystal holder electrodes 31 and 32. Piezoelectric crystal 33 is positioned between crystal holder electrodes 31 and 32 in the conventional manner. Crystal holder electrode 32 is also adapted to form one plate of capacitor 34, the other plate being formed by capacitor plate member 35. A small air gap separates capacitor plate member 35 and crystal holder electrode 32 to provide the necessary dielectric. Capacitor plate member 35 is supported by vibrating wire 36, which is in turn fixedly attached to screw 57. Vibrating wire 36 is a small resilient wire, such as music wire. Screw 57 is threaded through a hole in supporting member 58 and may be manipulated to adjust the air gap distance between crystal holder electrode 32 and capacitor plate member 35. Lock nut 59 is employed to prevent screw 57 from turning after this adjustment has been made.

It will become evident to those skilled in the art that when the described geophone is vibrated, as by seismic waves, the resiliency of wire 36 and inertia of capacitor plate member 35 will cause capacitor plate member 35 to vibrate with respect to crystal holder electrode 32, thereby changing the effective area of the plates of capacitor 34. Since the capacitance of capacitor 34 depends upon the effective area of the plates, it is obvious that the total capacitance in series with piezoelectric crystal 33 to ground will vary in accordance with the seismic waves acting upon the geophone. The value of this capacitance controls the frequency of piezoelectric crystal 33, which in turn controls the frequency of the oscillator to produce a frequency modulated signal which corresponds to the received seismic waves.

Figure 7:
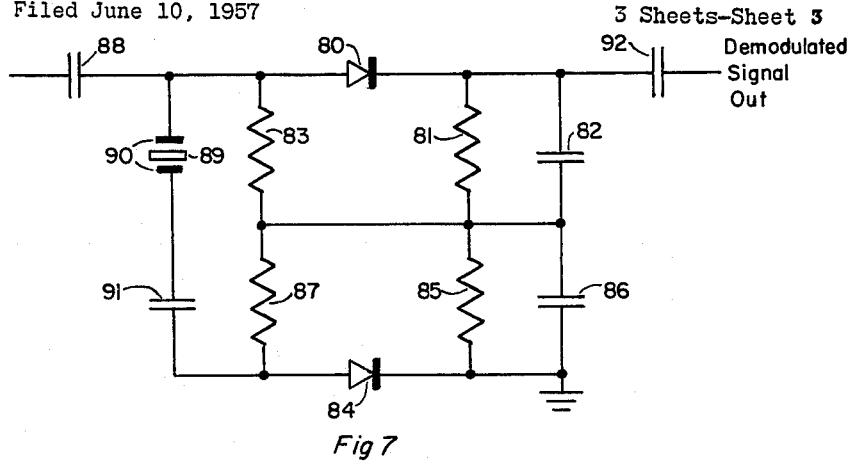
FIGURE 7 is a schematic circuit diagram of the preferred form of the novel discriminator disclosed in this invention.
Figure 4:
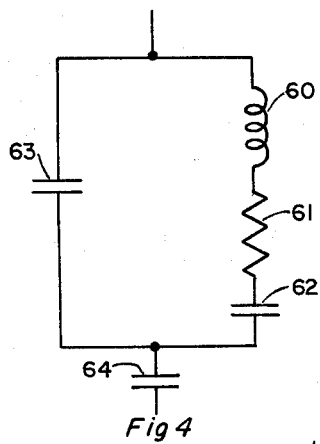
FIGURE 4 is a schematic circuit diagram of a network which is electrically equivalent to a piezoelectric crystal mounted in a conventional crystal holder.

In order to illustrate the operation of the discriminator shown in FIGURE 7, it is believed that a brief review of the prior art concerning piezoelectric crystals would be helpful. An equivalent circuit network for a piezoelectric crystal that is mounted in the conventional manner is shown in FIGURE 4. It will be appreciated from a brief inspection of this network that a piezoelectric crystal vibrating in a crystal holder is essentially a resonant circuit. The Q, which may be defined as the ratio of a resonant frequency to the frequency range within which the amplitude of vibration is at least 0.707 of its maximum, of a crystal is generally at least 1,000. This characteristic is one which is employed to great advantage in the novel discriminator of this invention. In the equivalent network, inductor 60 represents the effective mechanical inductance due to the mass of the crystal, resistor 61 represents the effective resistance due to the internal losses of the crystal, and capacitor 62 represents the effective mechanical capacitance due to the stiffness of the crystal. Capacitor 63 represents the capacitance which the crystal introduces between it faces due, largely, to its straight capacitive action and may be computed from a knowledge of the crystal dielectric constant, area of the electrodes, and the electrode spacing. Capacitor 63 is generally in the order of 100 times as great as capacitor 62. Capacitor 64 represents the effective series capacitance introduced by the air gap, if any, between the crystal and the crystal holder.

It is often the practice, where such equivalent networks become rather complicated, to analyze their behavior on the assumption that only pure reactances are present; that is, the small resistances representing power losses are assumed to be zero. Thus, the reactance curve of the equivalent network obtained in the well-known manner is exemplified in FIGURE 5. Inspection of this curve shows that the network is resonant at one frequency and antiresonant at another. Further, owing to the high value of the ratio of capacitor 63 to capacitor 62, these two frequencies will be very close together. Point 65 represents the resonant frequency where $X_L$ and $X_C$ components of the network have cancelled out and the overall reactance of the circuit is zero. However, as the frequency approaches antiresonance from either direction, as represented by point 66, either $X_L$ or $X_C$ rises rapidly and the overall reactance becomes infinite.

Figure 5:
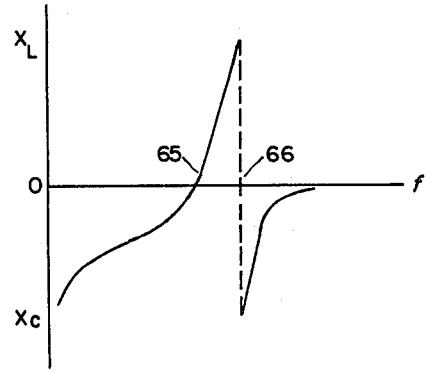
FIGURE 5 is a graphical representation of the reactance versus frequency characteristics of a conventional crystal.
Figure 6:
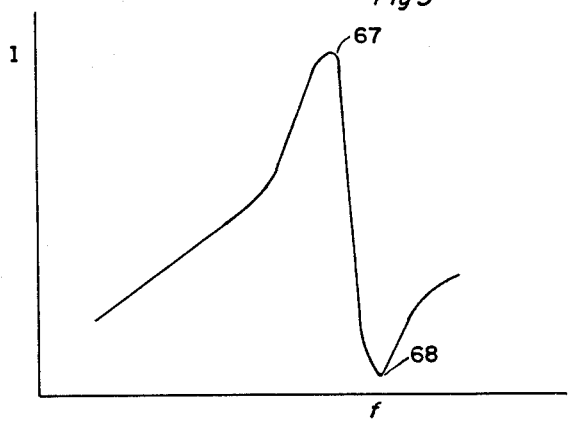
FIGURE 6 is a graphical representation of the current versus frequency characteristics of a conventional crystal when an electromotive force is applied to it.

The reactance curve of FIGURE 5, which shows the reactances of the crystal equivalent network reversing through infinity at antiresonant frequencies, assumes that ideal elements of zero resistance have been employed. Naturally, such ideal elements do not exist; and, furthermore, nature does not deal in infinities, but it can be shown that the magnitude of the impedance of such an equivalent circuit goes through a large maximum at the point of antiresonance. Therefore, if an electromotive force is impressed across a crystal, the current versus frequency curve will be similar to the one shown in FIGURE 6. This curve shows very clearly the resonant frequency at point 67, and slightly above it the antiresonant frequency at point 68. It is to be noted that, since the points of resonance and antiresonance are necessarily near each other as hereinbefore pointed out, the slope of the curve between these points is steep. Hence, in this region a great change in current is to be expected for a small change in frequency.

Referring now to FIGURE 7, there is illustrated a schematic circuit diagram of the preferred form of the novel discriminator. A close inspection of this circuit diagram will disclose that it is a balanced circuit, producing its frequency discriminations by properly combining the outputs of essentially two secondary circuits. Each of the two secondary circuits is a detector circuit in itself, complete with a rectifier, by-pass condenser, and load resistors. For example, the first secondary detector circuit includes rectifier 80, load resistor 81, by-pass capacitor 82, and D.C. return circuit resistor 83; and the second secondary detector circuit includes rectifier 84, load resistor 85, by-pass capacitor 86 and D.C. return circuit resistor 87. The secondary detector circuits are connected in such a way that the voltages developed across their load resistors will be in opposition.

Rectifiers 80 and 84 are conventional rectifiers, such as crystal diodes or vacuum tubes. By-pass capacitors 82 and 86 also serve to integrate the rectified radio frequencies across the load resistors. In choosing these capacitors, care must be taken that they are not made so large as to by-pass the higher frequencies of the demodulated signal. Load resistors 81, 83, 85, and 87 should be of a relatively high value and are for the purpose of providing a direct current return path for the rectified current.

Input capacitor 88 feeds the incoming frequency modulated signal directly to the first secondary detector circuit. The second secondary circuit, however, has the incoming signal impressed on it through the piezoelectric crystal 89 disposed in crystal holder 90, and variable capacitor 91. It will be apparent that when a signal is impressed on either of the secondary detector circuits, there will be a voltage developed across its respective load resistor. By tracing the flow of current through the load resistors, it may be seen that the voltage developed across resistor 81 is opposite in polarity from the voltage developed across resistor 85. Since the first secondary detector circuit is not frequency sensitive, there will always be a voltage developed across resistor 81 in proportion to the amplitude of the incoming signal. This would also hold true for the second secondary circuit, except crystal 89 disposed in crystal holder 90 presents a frequency sensitive impedance to the incoming signal for the second secondary detector circuit. If crystal 89 is chosen so that the carrier frequency of the incoming signal falls approximately mid-way between the resonant and antiresonant frequencies of the crystal, as shown by points 67 and 68, respectively, of FIGURE 6, then as the frequency of the incoming signal shifts back and forth at a rate determined by the frequency of the modulating signal, the voltage developed across load resistor 85 will rise and fall accordingly. Thus, a signal which corresponds to the signal used to modulate the incoming signal will be impressed on output capacitor 92.

The following table lists values of the various components which may be utilized in the geophone and discriminator circuits of this invention and are set forth here only for the purpose of assisting others to understand the invention and not for purposes of limitation.

| Element: | | Value |
|---|---|---|
| Resistor 30 | ohms | 1,000,000 |
| Resistor 37 | do | 200,000 |
| Resistor 81 | do | 100,000 |
| Resistor 83 | do | 100,000 |
| Resistor 85 | do | 100,000 |
| Resistor 87 | do | 100,000 |
| Capacitor 29 | micromicrofarads | 5 |
| Capacitor 34 | do | 2–10 |
| Capacitor 38 | microfarads | 0.01 |
| Capacitor 82 | micromicrofarads | 350 |
| Capacitor 86 | do | 350 |
| Capacitor 88 | microfarads | 0.01 |
| Capacitor 91 | micromicrofarads | 5–20 |
| Capacitor 92 | microfarad | 0.1 |
| Inductor 5 | millihenrys | 15 |
| Inductor 41 | do | 15 |
| Tube 1 | | Type 26A6 |

Having thus described my invention, it is to be understood that such description has been given by way of illustration and example only and not by way of limitation, reference for the latter purpose being had to the appended claims.

I claim:
1. A geophone assembly for detecting vibrational energy comprising:
   (a) a hollow casing member forming the exterior of said geophone,
   (b) a crystal oscillator mounted within said casing consisting of a piezoelectric crystal contained between the conductive plates of a first capacitor, and
   (c) a vibration detector means including a second capacitor in series with said crystal oscillator having a first conductive plate rigidly fixed to said casing member and a second conductive plate movably suspended on the free end of a laterally resilient wire anchored to said casing member.

2. A geophone assembly for detecting vibrational energy comprising:
   (a) a hollow casing member forming the exterior of said geophone,
   (b) an oscillator circuit mounted within said casing including a vacuum tube and a piezoelectric crystal oscillator, and
   (c) a second capacitor adapted to vary its effective plate area in response to the application of vibrational energy to said geophone connected in series with said first capacitor, said second capacitor having a first conductive plate rigidly fixed to said casing member and a second conductive plate movably attached to the remote end of a laterally resilient wire rigidly attached to said casing member by its other end.

References Cited by the Examiner
UNITED STATES PATENTS

| 2,137,304 | 11/1938 | Parkin | 324—56 |
| 2,386,049 | 10/1945 | Hausz | 343—100.10 |
| 2,522,870 | 9/1950 | Hammond | 343—100.10 |
| 2,532,060 | 11/1950 | Dicke | 343—100.10 |
| 2,669,877 | 2/1954 | Dunlop | 73—398 |
| 2,771,592 | 11/1956 | Edmonson | 340—17 |
| 2,848,710 | 8/1958 | Owen | 340—18 |
| 3,061,802 | 10/1962 | Westneat | 331—73 X |

BENJAMIN A. BORCHELT, *Primary Examiner.*

IRVING L. SRAGOW, CHESTER L. JUSTUS, SAMUEL FEINBERG, *Examiners.*